United States Patent
Wu et al.

(10) Patent No.: US 11,017,241 B2
(45) Date of Patent: May 25, 2021

(54) PEOPLE-FLOW ANALYSIS SYSTEM AND PEOPLE-FLOW ANALYSIS METHOD

(71) Applicant: NATIONAL CHIAO TUNG UNIVERSITY, Hsinchu (TW)

(72) Inventors: Bing-Fei Wu, Hsinchu (TW);
Chun-Hsien Lin, Keelung (TW);
Po-Wei Huang, Douliu (TW);
Meng-Liang Chung, Changhua (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 38 days.

(21) Appl. No.: 16/504,755

(22) Filed: Jul. 8, 2019

(65) Prior Publication Data

US 2020/0184229 A1   Jun. 11, 2020

(30) Foreign Application Priority Data

Dec. 7, 2018  (TW) .................................. 107144211

(51) Int. Cl.
*G06K 9/00* (2006.01)
*G06T 11/20* (2006.01)
*G06T 7/292* (2017.01)

(52) U.S. Cl.
CPC .......... *G06K 9/00778* (2013.01); *G06T 7/292* (2017.01); *G06T 11/20* (2013.01); *G06T 2210/12* (2013.01)

(58) Field of Classification Search
CPC .. G06K 9/00778; G06K 9/6271; G06T 11/20; G06T 7/292; G06T 2210/12; G06T 11/206; G06T 2207/30236
See application file for complete search history.

(56) References Cited

U.S. PATENT DOCUMENTS

| | | | | |
|---|---|---|---|---|
| 8,589,330 B2* | 11/2013 | Petersen | ............... | H04W 4/029 706/52 |
| 8,995,712 B2* | 3/2015 | Huang | ............... | G06K 9/00771 382/103 |
| 9,183,432 B2* | 11/2015 | Sasatani | ................... | G06T 7/73 |

(Continued)

OTHER PUBLICATIONS

Zhao, Z., et al., "Crossing-Line Crowd Counting with Two-Phase Deep Neural Networks," European Conference on Computer Vision (ECCV) 2016, Part VIII, LNCS 9912, pp. 712-726, 2016.*

(Continued)

*Primary Examiner* — Xuemei G Chen
(74) *Attorney, Agent, or Firm* — Birch, Stewart, Kolasch & Birch, LLP (57) ABSTRACT

A people-flow analysis system includes an image source, a computing device, and a host. The image source captures a first image and a second image. The computing device is connected to the image source. The computing device identifies the first image according to a data set to generate a first detecting image. The first detecting image has a position box corresponding to a pedestrian in the first image. The computing device generates a tracking image according to the data set and a difference between the first detecting image and the second image. The tracking image has another position box corresponding to a pedestrian in the second image. The host is connected to the computing device and generates a people-flow list according to the first detecting image and the tracking image.

6 Claims, 10 Drawing Sheets

(56) References Cited

U.S. PATENT DOCUMENTS

| | | | |
|---|---|---|---|
| 9,240,051 B2* | 1/2016 | Liu | G06K 9/00778 |
| 9,495,600 B2* | 11/2016 | Heu | G06K 9/00778 |
| 9,633,265 B2* | 4/2017 | Shellshear | G06K 9/00778 |
| 9,763,048 B2* | 9/2017 | Curtis | H04W 4/025 |
| 9,870,510 B2* | 1/2018 | Yang | G06T 7/20 |
| 10,474,918 B2* | 11/2019 | Bamba | G06T 11/00 |
| 10,679,428 B1* | 6/2020 | Chen | G06K 9/3241 |
| 2010/0322516 A1* | 12/2010 | Xu | G06K 9/00778 382/173 |
| 2011/0255740 A1* | 10/2011 | Wu | G06T 7/136 382/103 |
| 2012/0020518 A1* | 1/2012 | Taguchi | G06T 7/292 382/103 |
| 2013/0070969 A1* | 3/2013 | Hu | G06K 9/00778 382/107 |
| 2016/0019698 A1* | 1/2016 | Kalva | G06K 9/00778 382/103 |
| 2016/0132755 A1* | 5/2016 | Ikeda | G06N 20/00 382/159 |
| 2017/0161591 A1* | 6/2017 | English | G06K 9/4628 |
| 2017/0206669 A1* | 7/2017 | Saleemi | G06T 7/292 |
| 2017/0286774 A1* | 10/2017 | Gaidon | G06K 9/00805 |
| 2019/0122082 A1* | 4/2019 | Cuban | H04N 21/25883 |
| 2019/0130165 A1* | 5/2019 | Seshadri | G06K 9/00771 |
| 2019/0206085 A1* | 7/2019 | Jiang | G06K 9/6274 |
| 2019/0220673 A1* | 7/2019 | Ikeda | G06K 9/00778 |
| 2019/0258852 A1* | 8/2019 | Shimauchi | G06T 7/20 |
| 2019/0325208 A1* | 10/2019 | Wang | G06K 9/00979 |
| 2019/0378283 A1* | 12/2019 | Boult | G06T 7/215 |
| 2020/0082560 A1* | 3/2020 | Nezhadarya | G06T 15/20 |
| 2020/0098112 A1* | 3/2020 | Tao | G06K 9/00778 |
| 2020/0175693 A1* | 6/2020 | Takada | G06K 9/4652 |
| 2020/0250461 A1* | 8/2020 | Yang | G06K 9/46 |
| 2020/0320356 A1* | 10/2020 | Butt | H04N 21/4223 |

OTHER PUBLICATIONS

Chan et al., "Privacy Preserving Crowd Monitoring: Counting People without People Models or Tracking", IEEE Conference on Computer Vision and Pattern Recognition, Anchorage, Jun. 23-28, 2008, pp. 1-8.

* cited by examiner

PEOPLE-FLOW ANALYSIS SYSTEM AND PEOPLE-FLOW ANALYSIS METHOD

BACKGROUND

Technical Field

The present invention relates to a people-flow analysis system and a people-flow analysis method, and in particular, to a regional people-flow analysis system and a regional people-flow analysis method.

Related Art

Along with advancement of image analysis technologies, more image analysis applications emerge. For example, image analysis applications are applied in places such as marketplaces, department stores, and shops to perform image analysis and portrait detection. The image analysis applications can assist in making decisions to choose a site for a new shop, carry out promotion activities, and provide transportation services according to the people-flow situation. A conventional image analysis method usually requires additionally arranging camera devices at different visual angles, and the costs are high. Generally speaking, the effects of identifying and tracking moving pedestrians in the prior art still need to be improved.

SUMMARY

One object of the present invention is to provide a people-flow analysis system and a people-flow analysis method, to detect and track pedestrians.

One object of the present invention is to provide a people-flow analysis system and a people-flow analysis method that can adjust a parameter automatically according to a detecting and tracking result, to improve analysis accuracy.

The people-flow analysis system includes an image source, a computing device, and a host. The image source captures a first image and a second image. The computing device is connected to the image source. The computing device identifies the first image according to a data set to generate a first detecting image. The first detecting image has a position box corresponding to a pedestrian in the first image. The computing device generates a tracking image according to the data set and a difference between the first detecting image and the second image. The tracking image has another position box corresponding to a pedestrian in the second image. The host is connected to the computing device and generates a people-flow list according to the first detecting image and the tracking image.

The people-flow analysis method includes: (A) capturing a plurality of images continuously by an image source, wherein the plurality of images includes a first image and a second image; (B) transmitting the plurality of images to a computing device, wherein the computing device is configured to identify, the first image according to a data set to generate a first detecting image, and the first detecting image has a position box corresponding to a pedestrian in the first image; (C) generating a tracking image according to the data set and a difference between the first detecting image and the second image by the computing device, wherein the tracking image has another position box corresponding to a pedestrian in the second image; and (D) generating a people-flow list according to the first detecting image and the tracking image. Thus, a people flow in a photography scene is detected and tracked.

DETAILED DESCRIPTION

Figure 1:
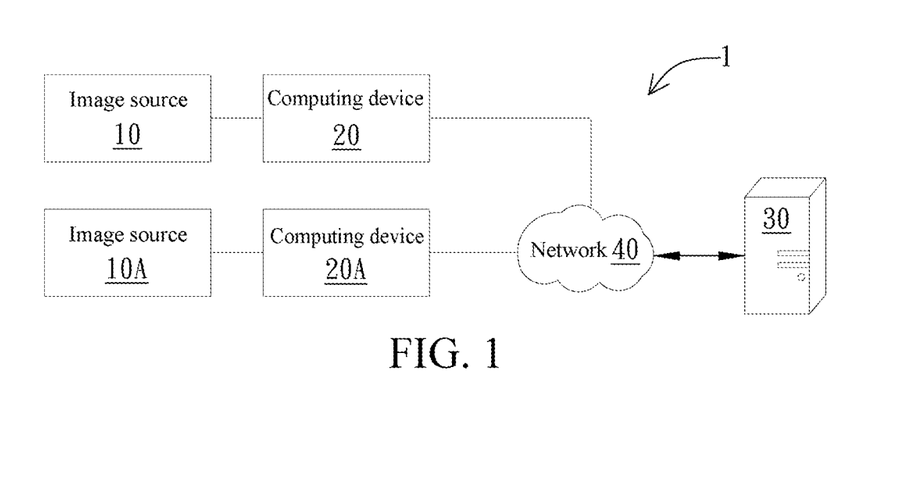
FIG. 1 is a schematic diagram of an embodiment of a people-flow analysis system according to the present invention.

FIG. 1 is a schematic diagram of an embodiment of a people-flow analysis system 1 according to the present invention. As shown in FIG. 1, the people-flow analysis system 1 includes image sources (10 and 10A), computing devices (20 and 20A), and a host 30. The image sources (10 and 10A) capture a plurality of images continuously. The image sources refer to devices, such as camera devices, for capturing images to be subsequently processed by the computing devices. For example, the plurality of images includes a first image and a second image. The first image and the second image are images captured successively at different moments. The computing device 20 is connected to the image source 10 and the computing device 20A is connected to the image source 10A. The computing devices (20 and 20A) are, for example, embedded systems or personal computers. For example, regarding the image source 10 and the computing device 20, the computing device 20 identifies the first image according to a data set, to generate a first detecting image. The data set is image file data having pedestrians and the image file data serves as image samples. In an embodiment, the data set is an image sample in which a position of a pedestrian is marked. In another embodiment, the data set is a plurality of images having crowds, each crowd image has preset position boxes corresponding to each pedestrian, and the images having crowds serve as image samples. The image samples are used to train a neural network model, and the trained neural network model identifies the images captured by the image source, to generate the first detecting image. The first detecting image has a position box corresponding to a pedestrian in the first image. In other words, when a pedestrian is identified to appear in the first image, a position box is generated at a position in the first detecting image corresponding to the pedestrian. Similarly, the second image captured at a next moment is also identified by the computing device, to generate another detecting image.

Furthermore, the computing device 20 generates a tracking image according to the data set, and a difference between the first detecting image and the second image. For example, the data set has an image sample in which a position of a pedestrian is marked and image samples of the pedestrian at different moments, the image samples are used to train another neural network model, the trained neural network model identifies the first detecting image and the second image, to generate a tracking image according to a difference between the first detecting image and the second image. The tracking image has another position box corresponding to a pedestrian in the second image. It should be noted that, the neural network model configured to generate a detecting image and the neural network model configured to generate a tracking image preferably are different neural network models.

The people-flow analysis system includes at least one image source. As shown in FIG. 1, the people-flow analysis system 1 includes a plurality of image sources (10 and 10A). Different image sources may be mounted at different positions to photograph different scenes. The image sources (10 and 10A) are connected to the host 30 through the computing devices. As shown in FIG. 1, the computing devices are connected to the host 30 through a network 40. The host 30 generates a people-flow list according to the detecting images and the tracking images obtained at different moments.

Figure 2:
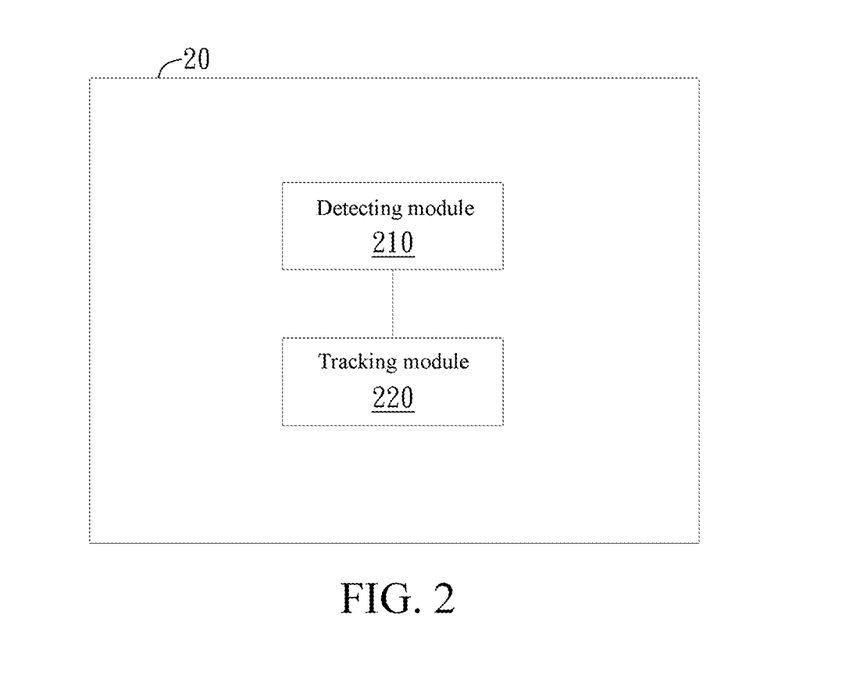
FIG. 2 is a schematic diagram of an embodiment of a computing device.

FIG. 2 is a schematic diagram of an embodiment of a computing device 20. As shown in FIG. 2, the computing device 20 includes a detecting module 210 and a tracking module 220. As stated above, the people-flow analysis system analyzes and tracks images through different neural network models. The detecting module 210 and the tracking module 220 are respectively processing units in the computing device 20 for performing different neural network models. The computing device 20 has parameters associated with a data set. Parameters of different neural network models may be pre-adjusted through a data set in a training stage. For example, the detecting module 210 has detecting parameters and the tracking module 220 has tracking parameters. The detecting module 210 is configured to generate a first detecting image. The tracking module 220 is configured to generate a tracking image.

Figure 3:
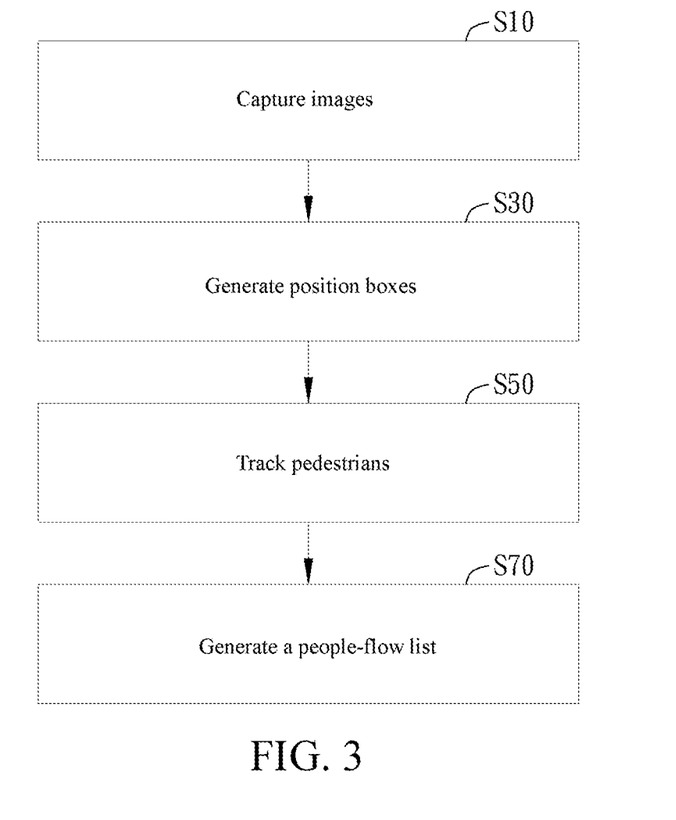
FIG. 3 is a flowchart of an embodiment of a people-flow analysis method.

FIG. 3 is a flowchart of an embodiment of a people-flow analysis method. As shown in FIG. 3, the people-flow analysis method includes steps S10-S70. In step S10, the image source captures a plurality of images continuously. For example, the plurality of images includes a first image and a second image. In step S30, the first image and the second image are transmitted to the computing device, the computing device identifies the first image according to a data set, to generate a first detecting image, and the first detecting image has a position box corresponding to a pedestrian in the first image. The second image also generates another detecting image by the foregoing method.

In step S50, the computing device generates a tracking image according to the data set, and a difference between the first detecting image and the second image. The tracking image has another position box corresponding to a pedestrian in the second image. In step S70, a people-flow list is generated according to the first detecting image and the tracking image.

Figure 4A:
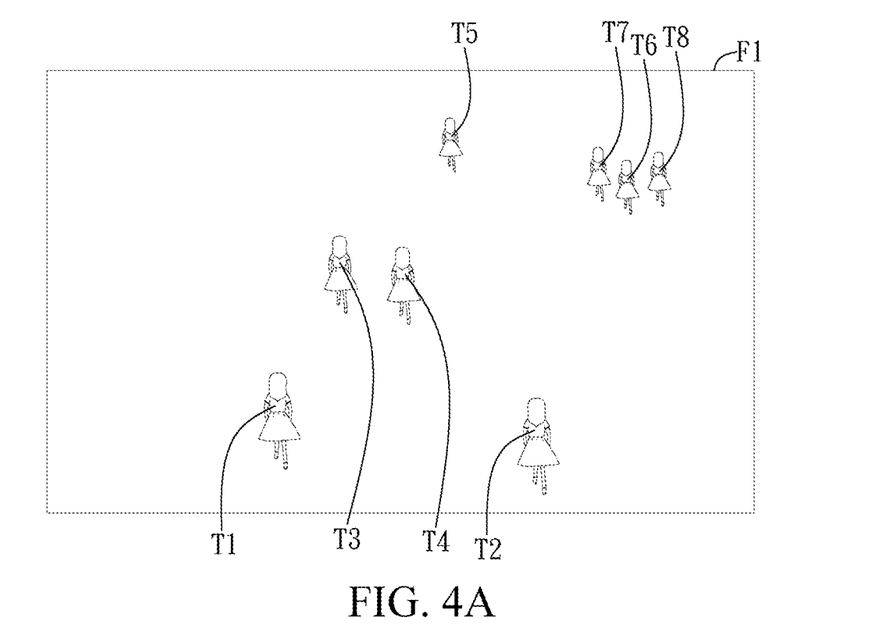
FIG. 4A and FIG. 4B are schematic diagrams of an embodiment of generating a detecting image.
Figure 4B:
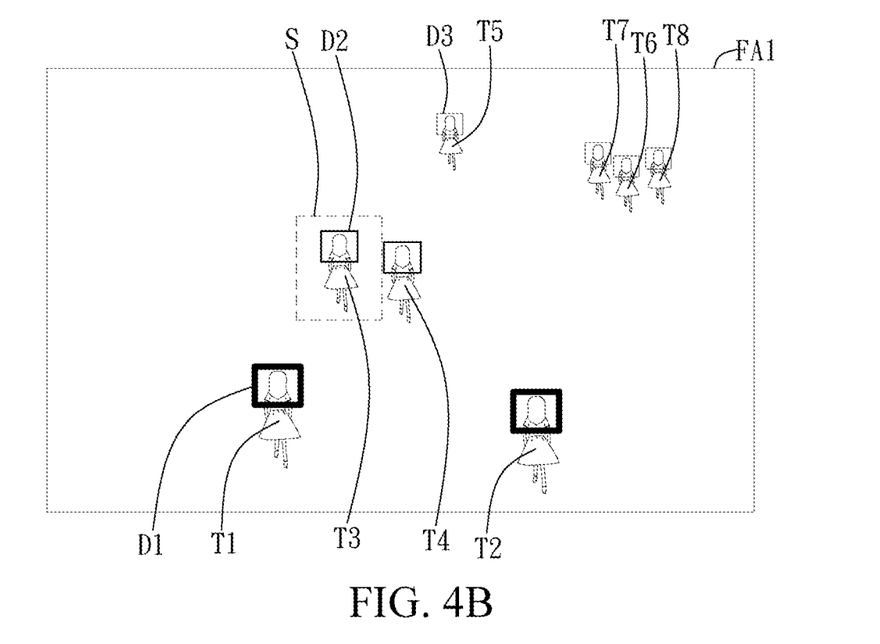

FIG. 4A to FIG. 4B are schematic diagrams of an embodiment of generating a detecting image. As shown in FIG. 4A, the first image F1 has a plurality of pedestrians T1-T8. As shown in FIG. 4B, the first detecting image FA1 has position boxes D1-D3 corresponding to pedestrians T1-T8. For example, a neural network model compresses the first image in different degrees, to generate a plurality of images having different resolutions. Since pedestrian images have different sizes due to difference distances from a visual field of the image source (referring to FIG. 4A), compression degrees of images are associated with distribution of distances of pedestrian images from visual fields. An image compressed in a high degree is mainly used to identify an area near the visual field of the image source and an image compressed in a small degree is mainly used to identify an area far away from the visual field of the image source. Next, images with different resolutions are gradually divided into a plurality of blocks and confidence values of each block in the images with different resolutions are analyzed. If a confidence value is larger than a preset threshold, a pedestrian is determined to exist. A pedestrian detecting result obtained from an image compressed in a high degree is roughly corresponding to an area near the visual field of the image source, and on the contrary, a pedestrian detecting result obtained from the an image compressed in a small degree is roughly corresponding to an area far away from the visual field of the image source.

In an embodiment, a compression degree of an image captured by the image source may be further set in the detecting module according to demand, and a people flow in a specific visual field is taken as an efficient detecting result (for example, detecting results away from the visual field are excluded), thereby obtaining required people-flow distribution information and reducing unnecessary computation amount.

For example, in FIG. 4B, the first image is divided into three different visual fields according to compression degrees, and different position boxes are generated according to pedestrian detecting results. For example, the pedestrians T1 and T2 are position boxes D1, the pedestrians T1 and T4 are position boxes D2, and the pedestrians T5-T8 are position boxes D3. The forms of the position boxes (D1, D2, D3) may further be distinguished by different marks according to distances from the visual field. For example, in FIG. 4B, the position boxes in the area far away from the visual field are thin line boxes and the position boxes in the area near the visual field are bold line boxes. In other embodiments, the forms of the position boxes (D1, D2, D3) may be distinguished by different colors and used to distinguish the positions of the pedestrian images in the different visual fields. Not only the quantity of pedestrians in the space can be obtained, but also a user can interpret results of detecting an image more easily. After the position boxes are generated, the quantity of pedestrians can be obtained according to the quantity of position boxes. The efficiency of detecting pedestrians may be enhanced in this manner.

Figure 5A:
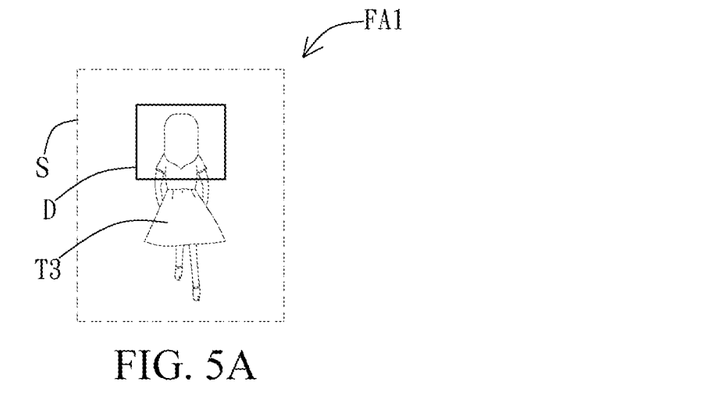
FIG. 5A to FIG. 5C are schematic diagrams of an embodiment of generating a tracking image.
Figure 5B:
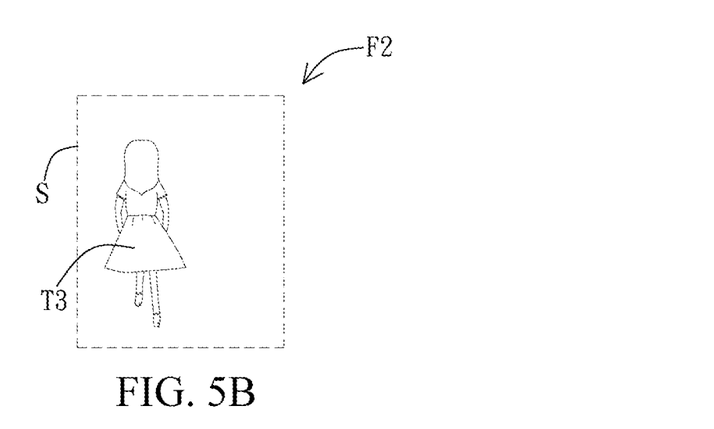
Figure 5C:
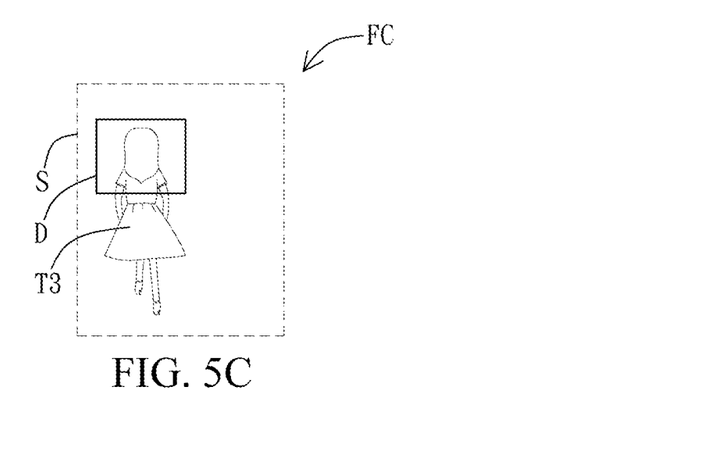

FIG. 5A to FIG. 5C are schematic diagrams of an embodiment of generating a tracking image. The tracking module generates a tracking image according to the data set, the first detecting image, the second image, and a pixel difference between the first detecting image and the second image. FIG. 5A shows a local portion of the first detecting image FA1. As shown in FIG. 5A, the pedestrian T3 has a corresponding position box D. The people-flow analysis system sets a search range S for the position boxes. The search range S is larger than the range of the position box D. FIG. 5B shows a local portion of the second image F2. As shown in FIG. 5B, the pedestrian T3 moves to different positions in the second image. The computing device generates a tracking image according to the first detecting image, the second image, and a pixel difference between the first detecting image and the second image. In other words, the tracking image is generated according to the detecting result of the previous image, the current image, and a pixel difference between the detecting result of the previous image and the current image. FIG. 5C shows a local portion of the tracking image FC. As shown in FIG. 5C, the pedestrian T3 has a corresponding position box D. Thereby, pedestrian image tracking is finished. Compared with the manner that only the first detecting image and the second image are considered, a pixel difference between images may be used to enhance accuracy of an image tracking result. In other words, by using differential information of images, such as a pixel difference, the tracking effects may not be influenced by a change of a local body feature (for example, a head). In other embodiments, the tracking image may be generated by using cross correlation or template matching. Differential information of images is generated by using the foregoing manner, and the tracking result may not be influenced by a change of a local body feature for it only depends on the detecting image and the image of the image source.

Figure 6:
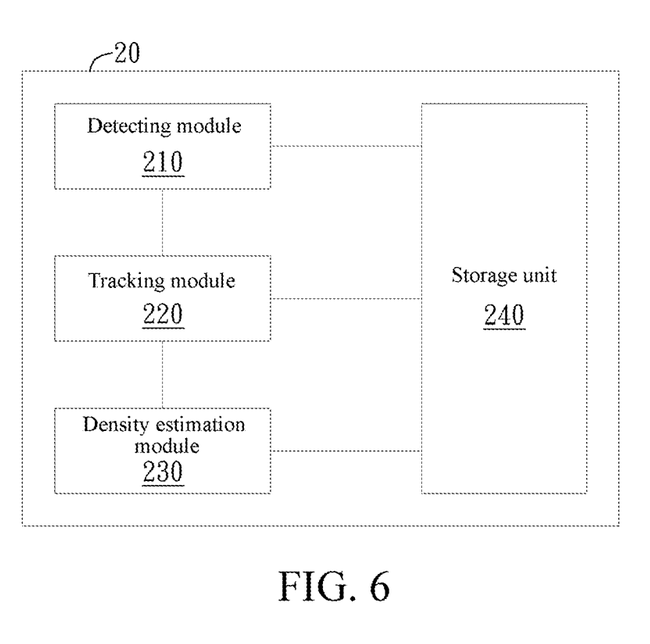
FIG. 6 is a schematic diagram of another embodiment of a computing device.

FIG. 6 is a schematic diagram of another embodiment of a computing device. As shown in FIG. 6, in this embodiment, besides the detecting module 210 and the tracking module 220, the computing device 20 may further include a density estimation module 230 and a storage unit 240. The detecting module 210, the tracking module 220, and the density estimation module 230 are respectively processing units in the computing device 20 for performing different neural network models. The data set, for example, includes image samples corresponding to pedestrian distribution conditions. The density estimation module 230 has density parameters. The density estimation module 230 may generate a density map according to the images captured by the image source.

Specifically speaking, the density map presents a crowd density distribution status, and for example, is represented by a hot spot. A range of the hot spot represents an aggregation degree of a crowd and a color of the hot spot represents a quantity of crowds. The distribution status of pedestrians in the space is represented by the density map, thereby estimating an area where pedestrians are distributed densely and an area where pedestrians are distributed dispersedly. The storage unit 240 may store data such as the data set, the first detecting image, the tracking image and the density map. In an embodiment, the storage unit can establish image samples of pedestrian distribution conditions. In other embodiments, the image samples of pedestrian distribution conditions may be converted by an image sample in which pedestrian positions are marked by pedestrians themselves. In other words, an image sample for training a neural network model in the density estimation module 230 may not be established in advance and can reduce a storage space.

Figure 7:
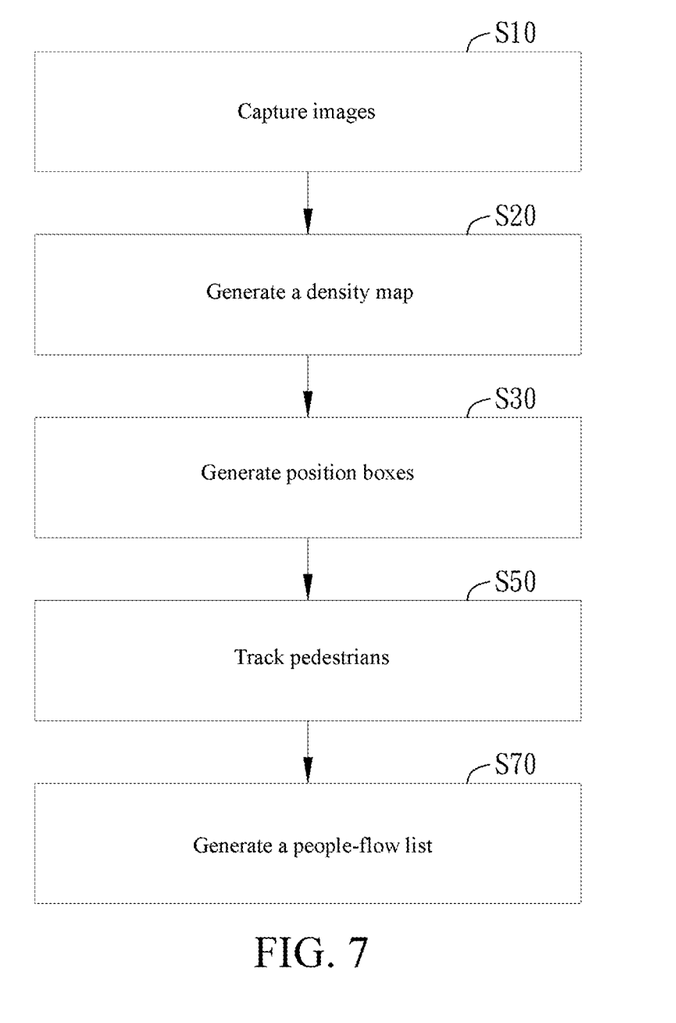
FIG. 7 is a flowchart of another embodiment of a people-flow analysis method.

FIG. 7 is a flowchart of another embodiment of a people-flow analysis method. As shown in FIG. 7, the procedure is different from the foregoing procedure in that, a step of density analysis is added in the people-flow analysis method. In step S20, the computing device generates a density map according to the data set and the first image. As stated above, the computing device may include a density estimation module. Another neural network model is trained according to an image sample of a pedestrian distribution condition of the data set and performed by the density estimation module. The density estimation module identifies the first image through the trained neural network model, to generate a density map.

Figure 8A:
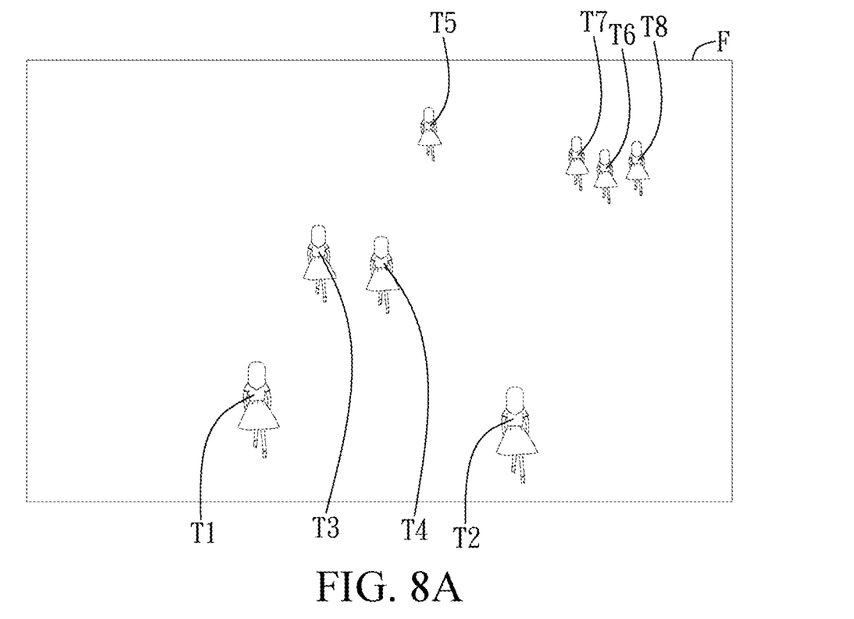
FIG. 8A and FIG. 8B are schematic diagrams of an embodiment of generating a density map.
Figure 8B:
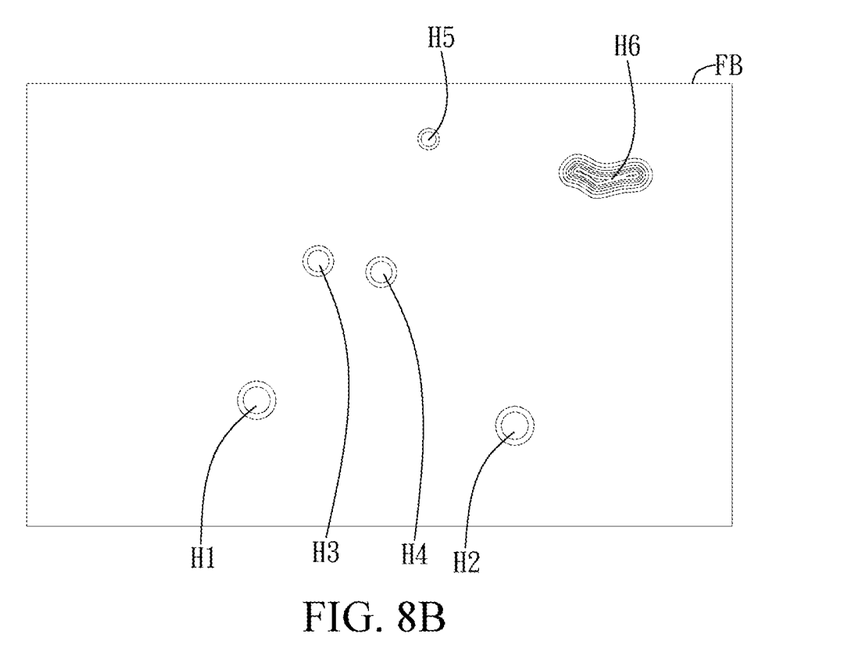

FIG. 8A and FIG. 8B are schematic diagrams of an embodiment of generating a density map. As shown in FIG. 8A, the image F has a plurality of pedestrians T1-T8. As shown in FIG. 8B, the density map FB has hot spots H1-H6 corresponding to the pedestrians T1-T8. In an example in FIG. 8B, the hot spots H1-H6 are represented by contour maps, and sizes of contour lines are changed according to distances from the visual field and the aggregation degree of the crowd. If contour lines of one hot spot are denser, the hot spot has a high crowd density and more pedestrians are aggregated. As shown in FIG. 8B, the pedestrians T1-T5 are respectively corresponding to the hot spots H1-H5. The pedestrians T6-T8 are corresponding to the hot spot H6 and contour lines of the hot spot H6 are distributed more densely than other hot spots. Thereby, a density analysis step is first performed to estimate a density of a crowd and rough pedestrian distribution, and then, detecting and tracking steps are performed to determine a quantity of pedestrians and position directions of pedestrians.

Figure 9:
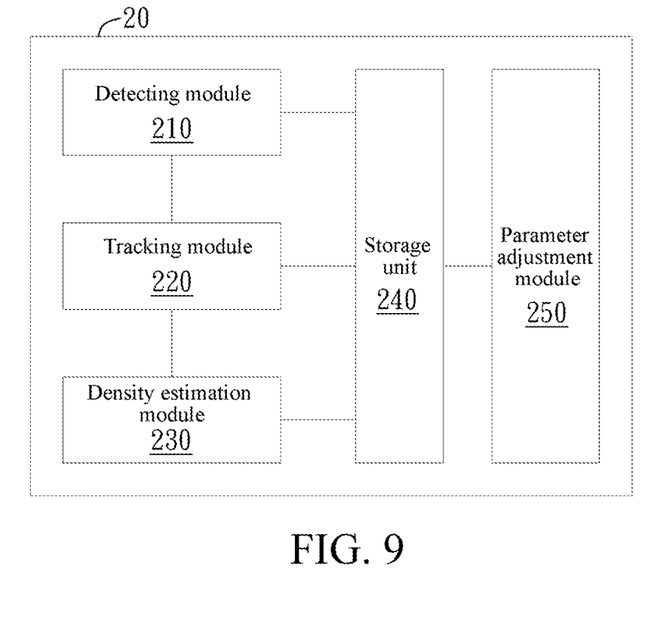
FIG. 9 is a schematic diagram of another embodiment of a computing device.

FIG. 9 is a schematic diagram of another embodiment of a computing device. As shown in FIG. 9, the computing device 20 includes a detecting module 210, a tracking module 220, a density estimation module 230, a storage unit 240, and a parameter adjustment module. The detecting module 210, the tracking module 220, and the density estimation module 230 respectively are deigned based on neural network models. That is, the detecting module 210, the tracking module 220, and the density estimation module 230 are processing units in the computing device 20 for respectively performing different neural network models. Each of the neural network models has a corresponding parameter set. The parameter adjustment module 250 generates similarity information according to the data set and the image from the image source and generates a weight corresponding to the similarity information, and the parameter adjustment module 250 adjusts the parameter set according to the weight.

For example, the detecting module 210 has detecting parameters and the tracking module 220 has tracking parameters and the density estimation module 230 has density parameters. The data set has an image sample in which positions of pedestrians are marked. The image source captures a first image and a second image. The parameter adjustment module 250 generates similarity information of the first image and the image sample according to the image sample. Similarly, another piece of similarity information of the second image and the image sample is generated according to the image sample. Different weights are generated according to similarity degrees and the detecting parameter, the tracking parameter, and the density parameter are adjusted according to the weights.

It should be noted that, an analysis result of the parameter adjustment module 250 on an image captured by the image source is different from analysis results of other processing units (such as the detecting module 210, the tracking module 220, and the density estimation module 230) on an image captured by the image source. Since an actual scene may be different from an image sample of a data set, accuracy of analysis results of the processing units (such as the detecting module 210, the tracking module 220, and the density estimation module 230) on an image captured by the image source may possibly be influenced. The parameter adjustment module 250 adjusts parameter sets of neural network models in each processing unit (such as the detecting module 210, the tracking module 220, and the density estimation module 230) according to differences of scenes.

Figure 10:
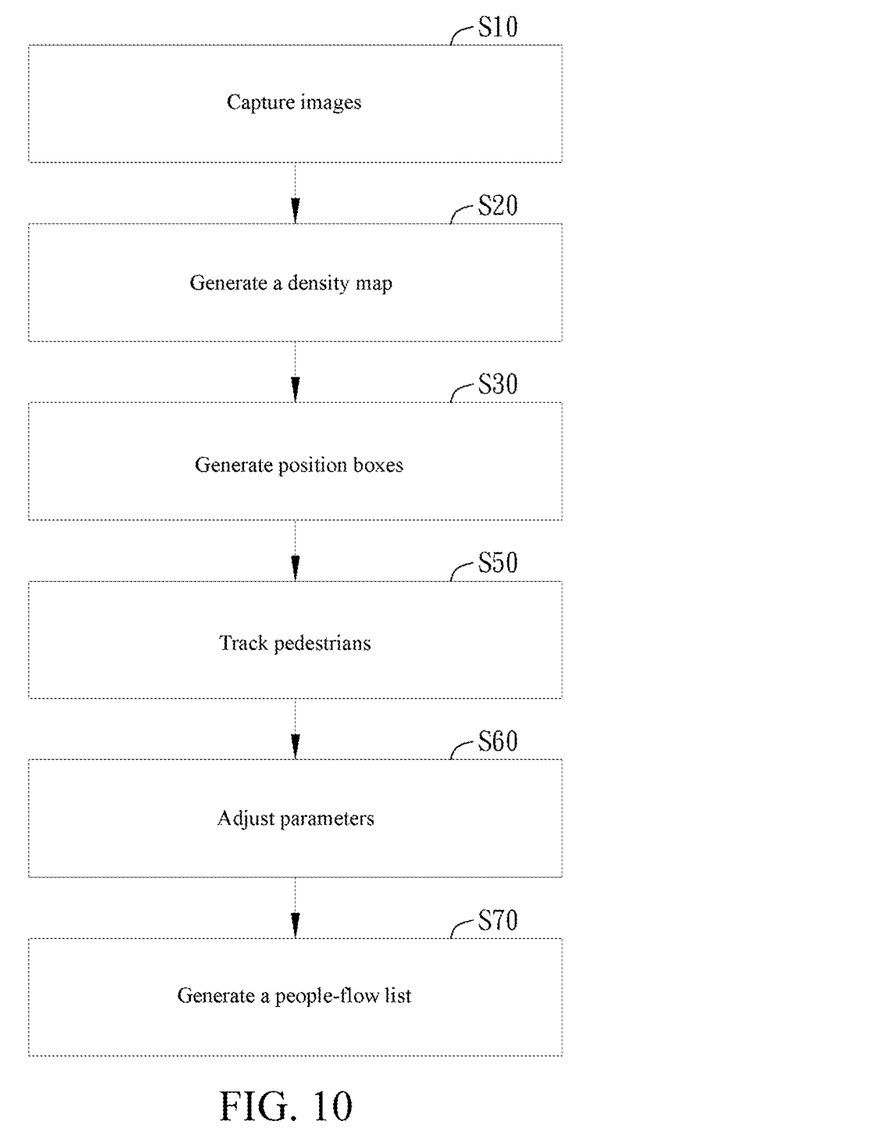
FIG. 10 is a flowchart of another embodiment of a people-flow analysis method.

FIG. 10 is a flowchart of another embodiment of a people-flow analysis method. As shown in FIG. 10, the procedure is different from the foregoing procedure in that, a parameter adjustment step is added in the people-flow analysis method. In step S60, the parameter adjustment module generates similarity information according to the data set and a plurality of images (the first image and the second image) from the image source and adjusts parameters according to the weights obtained from the similarity information. As stated above, the computing device has detecting parameters, tracking parameters, and density parameters corresponding to the different neural network models. Furthermore, the parameter adjustment step includes comparing the data set with the first image and the second image, to generate a plurality of similarity information. For example, the data set has a plurality of image samples in which positions of pedestrians are marked and a plurality of image samples corresponding to pedestrian distribution conditions. The first image is gradually compared with the plurality of image samples in which positions of pedestrians are marked to generate a plurality of pieces of similarity information. Similarly, a plurality of pieces of similarity information is also generated for the second image. Corresponding weights are generated correspondingly according to different similarity information, and the parameter adjustment module adjusts the parameter sets according to the weights.

For example, the density map obtained after people-flow analysis is gradually compared with a plurality of image samples corresponding to pedestrian distribution conditions, to generate a plurality of pieces of similarity information. According to the foregoing similarity information, the computing device generates weights corresponding to each piece of similarity information and adjusts the density parameters of the neural network models in the density estimation module according to the weights. In an embodiment, the parameter adjustment module may be configured to perform a parameter adjustment step during idle time of the computing device. For example, the storage unit stores an image captured by the image source for a certain scene for a period of time, and the computing device invokes the image captured by the image source and the data set to perform similarity computation during idle time, to generate different weights. The parameter sets of the neural network models are adjusted according to weights. Thereby, the image samples existing in the database can adapt to a current scene in a better way, to improve performance in analyses such as pedestrian detection and pedestrian tracking.

For the density map obtained after people-flow analysis, in another embodiment, the parameter adjustment step includes: generating, by the computing device, a plurality of pieces of similarity information according to the data set and the density map. The similarity information includes a quantity estimation value and a distance estimation value. The parameter adjustment module generates a weight according to the quantity estimation value and the distance estimation value, to adjust a parameter set. For example, the step of generating the similarity information of the density map is further adjusted according to the quantity estimation value and the distance estimation value. The quantity estimation value represents a difference between a quantity of hot spots of a people-flow analysis result and a quantity of hot spots of the image samples of the data set. The distance estimation value represents a difference between a position of a hot spot of a people-flow analysis result and a position of a hot spot of the image sample of the data set.

Figure 11A:
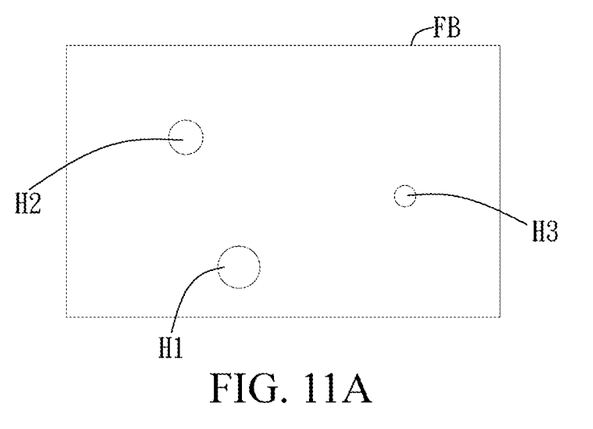
FIG. 11A to FIG. 11C are schematic diagrams of different embodiments of a density map.
Figure 11B:
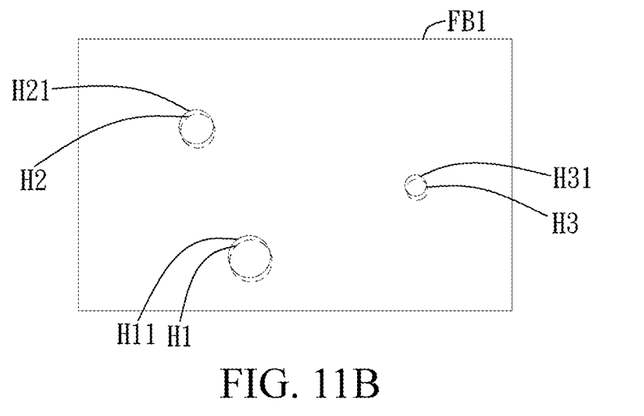
Figure 11C:
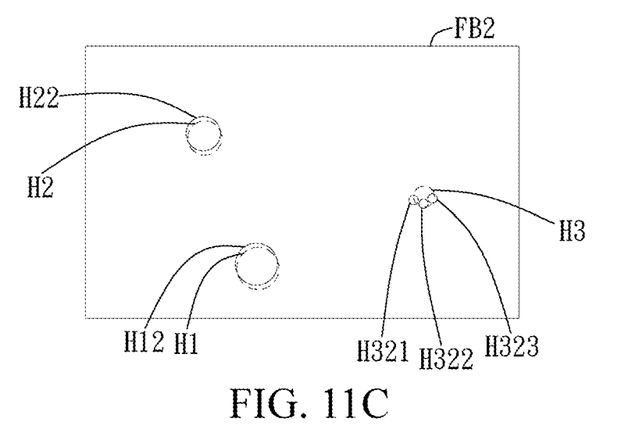

FIG. 11A to FIG. 11C are schematic diagrams of different embodiments of a density map. As shown in FIG. 11A, the sample of the density map FB has hot spots H1-H3. As shown in FIG. 11B, according to an analysis result of the people-flow analysis system, the density map FB1 has hot spots H11, H21, and H31. For the purpose of convenient description, the positions (represented by dotted circles) of the hot spots in FIG. 11A are added to FIGS. 11B and 11C. FIG. 11C shows different analysis results of the people-flow analysis system. In FIG. 11C, according to the analysis results, another density map FB2 has hot spots H12, H22, H321, H322, and H323. Compared with the results in FIG. 11B, the density map in FIG. 11C is greatly different in terms of the quantity estimation value (a quantity of circles) and a distance estimation value (positions of circles), that is, the similarity degree compared with the data set is low. The parameter adjustment module generates weights corresponding to each piece of similarity information according to different similarity information and adjusts the parameter sets of the neural network models in the density estimation module according to the weights.

Table 1 is an example of a people-flow list. As shown in Table 1, the pedestrian detecting result and the pedestrian tracking result are transmitted to the host. The host respectively makes records at different moments according to the pedestrian detecting result and the pedestrian tracking result of the photography scene, to generate the people-flow list.

TABLE 1

| Time | Site | Quantity of people | Direction |
| --- | --- | --- | --- |
| 08:00 AM | Scene A | 100 | Toward x1 |
| 11:00 AM | Scene A | 30 | Toward x2 |
| 13:00 PM | Scene A | 70 | Toward x3 |

The present invention has been described by using the foregoing relevant embodiments. However, the embodiments are only examples for implementing the present invention. It should be indicated that, the disclosed embodiments do not limit the scope of the present invention. On the contrary, the amendments and equivalent settings without departing from the spirit and scope of the claims all fall in the scope of the present invention.

What is claimed is:
1. A people-flow analysis system, comprising:
an image source configured to continuously capture a plurality of images, the plurality of images comprising a first image and a second image;
a computing device connected to the image source, comprising:
a detecting module configured to identify the first image according to a data set to generate a first detecting image having a position box corresponding to a pedestrian in the first image;
a tracking module configured to generate a tracking image having another position box corresponding to a pedestrian in the second image according to the data set, the first detecting image, the second image, and a pixel difference between the first detecting image and the second image;
a density estimation module configured to generate a density map according to the data set and the first image; and
a parameter adjustment module configured to generate similarity information according to the data set and the images from the image source and to generate a weight corresponding to the similarity information, and a host connected to the computing device and configured to generate a people-flow list according to the first detecting image and the tracking image, wherein the detecting module, the tracking module, and the density estimation module respectively are deigned based on neural network models, wherein each of the neural network models has a corresponding parameter set, and wherein the parameter adjustment module is configured to adjust the corresponding parameter set according to the weight.

2. The people-flow analysis system according to claim 1, wherein the similarity information comprises a number estimated value and a distance estimated value, and the parameter adjustment module is configured to generates the weight according to the number estimated value and the distance estimated value to adjust the parameter set.

3. The people-flow analysis system according to claim 1, wherein the data set is a plurality of crowd images, and each of the crowd images has a preset position box corresponding to each pedestrian.

4. A people-flow analysis method implemented in a people-flow analysis system, the system comprising an image source and a computing device, the computing device comprising a parameter adjustment module, a detecting module, a tracking module, and a density estimation module, the method comprising steps of:

capturing a plurality of images continuously by the image source, the plurality of images comprising a first image and a second image;

transmitting the images to the computing device, the detecting module, the tracking module, and the density estimation module respectively designed based on neural network models, each of the neural network models having corresponding parameter set, the method further comprising:

configuring the detecting module to identify the first image according to a data set to generate a first detecting image having a position box corresponding to a pedestrian in the first image;

configuring the tracking module to generate a tracking image having another position box corresponding to a pedestrian in the second image according to the data set, the first detecting image, the second image, and a pixel difference between the first detecting image and the second image;

generating a people-flow list according to the first detecting image and the tracking image; and configuring the parameter adjustment module to generate similarity information according to the data set and the images from the image source, to generate a weight corresponding to the similarity information, and to adjust the corresponding parameter set according to the weight.

5. The people-flow analysis method according to claim 4, further comprising a step of generating a density map according to the data set and the first image by the density estimation module.

6. The people-flow analysis method according to claim 4, wherein the similarity information comprises a number estimated value and a distance estimated value, and the method further comprises a step of generating the weight according to the number estimated value and the distance estimated value to adjust the parameter set.

* * * * *